US012409097B2

(12) United States Patent
Hadley

(10) Patent No.: US 12,409,097 B2
(45) Date of Patent: Sep. 9, 2025

(54) MASSAGE DEVICE

(71) Applicant: John Stephen Hadley, San Antonio, TX (US)

(72) Inventor: John Stephen Hadley, San Antonio, TX (US)

( * ) Notice: Subject to any disclaimer, the term of this patent is extended or adjusted under 35 U.S.C. 154(b) by 0 days.

(21) Appl. No.: 18/514,802

(22) Filed: Nov. 20, 2023

(65) Prior Publication Data

US 2024/0342047 A1 Oct. 17, 2024

Related U.S. Application Data

(60) Provisional application No. 63/426,905, filed on Nov. 21, 2022.

(51) Int. Cl.
*A61H 15/00* (2006.01)

(52) U.S. Cl.
CPC ..... *A61H 15/00* (2013.01); *A61H 2015/0028* (2013.01); *A61H 2201/0123* (2013.01); *A61H 2201/0126* (2013.01); *A61H 2201/0157* (2013.01); *A61H 2201/1253* (2013.01); *A61H 2201/169* (2013.01)

(58) Field of Classification Search
CPC .... A61H 2201/0123; A61H 2201/0126; A61H 2015/0028; A61H 15/00; A61H 2205/081; A61H 2015/0014; A61H 2201/1623
See application file for complete search history.

(56) References Cited

U.S. PATENT DOCUMENTS 2,577,129 A * 12/1951 Johnston ................ A61H 15/00 492/30
2,619,957 A * 12/1952 Hague ................ A61H 15/0092 601/122
3,078,484 A * 2/1963 Briggs ................... A47K 7/043 4/606
4,416,271 A * 11/1983 Chester .................. A61H 15/00 482/904
5,730,708 A * 3/1998 Spratt .................... A61H 7/003 601/118
5,935,090 A * 8/1999 Kennon ............. A61H 15/0092 601/134
7,087,004 B1 * 8/2006 Berke .................... A61H 7/002 601/134
9,849,065 B1 * 12/2017 Kozlevcar .............. A61H 39/04
11,872,177 B1 * 1/2024 Graham ................. A61H 15/00
2004/0009853 A1 * 1/2004 Smith .................... A63B 17/04 482/92

(Continued)

*Primary Examiner* — Justine R Yu
*Assistant Examiner* — Christopher E Miller
(74) *Attorney, Agent, or Firm* — Andrew S. Rapacke; The Rapacke Law Group

(57) ABSTRACT

A massage device can include a first wheel assembly, including a first base; a first wheel supported at a predetermined distance from a first side of the first base; at least one first stem attached to a second side of the first base; the massage device further including a body, the body having at least one socket, wherein the at least one socket is constructed and arranged to receive the at least one first stem, and wherein the body is constructed and arranged to prevent the at least one first stem from rotating within the at least one socket; and two or more arms connected to the body, wherein the two or more arms are constructed and arranged to removably mount the body onto a wall of a building.

20 Claims, 10 Drawing Sheets

(56) References Cited

U.S. PATENT DOCUMENTS

| | | | | |
|---|---|---|---|---|
| 2008/0077062 | A1* | 3/2008 | Leiter | A61H 7/001 601/134 |
| 2008/0146979 | A1* | 6/2008 | Brown | A61H 37/00 601/115 |
| 2010/0121235 | A1* | 5/2010 | Sasano | A61H 7/001 601/134 |
| 2010/0222809 | A1* | 9/2010 | Grabill | A61H 39/04 606/204 |
| 2011/0166481 | A1* | 7/2011 | Rhoad | A61H 7/002 248/231.51 |
| 2013/0023807 | A1* | 1/2013 | Hennessey | A61H 7/003 601/119 |
| 2013/0217544 | A1* | 8/2013 | Anaya | A63B 23/1218 482/40 |
| 2015/0133271 | A1* | 5/2015 | Jones | A61H 15/00 482/51 |
| 2016/0338901 | A1* | 11/2016 | Cohen | A61H 15/00 |
| 2017/0312168 | A1* | 11/2017 | Drath | A61H 1/0292 |
| 2018/0104143 | A1* | 4/2018 | Jamieson | A61H 7/002 |
| 2018/0142832 | A1* | 5/2018 | Inouye | F16M 13/022 |
| 2018/0296430 | A1* | 10/2018 | Bouch | A61H 15/00 |
| 2019/0269573 | A1* | 9/2019 | Paniccia | A61H 7/007 |
| 2019/0274914 | A1* | 9/2019 | Hunter | A61B 90/50 |
| 2019/0307639 | A1* | 10/2019 | Kiernan | A61H 1/0277 |
| 2020/0060927 | A1* | 2/2020 | Bailey | A61H 15/00 |
| 2021/0121357 | A1* | 4/2021 | Held | A61H 15/00 |
| 2021/0361519 | A1* | 11/2021 | Hagy | A61H 7/005 |
| 2022/0096314 | A1* | 3/2022 | Nagy | A61H 15/00 |
| 2022/0125665 | A1* | 4/2022 | Allen | A61H 39/04 |
| 2022/0347036 | A1* | 11/2022 | Dossman | A63B 23/035 |

* cited by examiner

MASSAGE DEVICE

CROSS-REFERENCE TO RELATED APPLICATION

This application claims priority to and the benefit of U.S. Provisional Patent Application No. 63/426,905 filed on Nov. 21, 2022, which is hereby incorporated by reference herein.

TECHNICAL FIELD

The embodiments generally relate to the field of massage devices.

BACKGROUND

Massage devices are typically handheld devices. A user usually must hold and carry these handheld massage devices throughout the entire duration of a massage, whether the user massages themselves, or the user massages another user.

There is a need for a massage device that does not have to be held or carried by a user during a massage.

SUMMARY

This summary is provided to introduce a variety of concepts in a simplified form that is further disclosed in the detailed description of the embodiments. This summary is not intended to identify key or essential inventive concepts of the claimed subject matter, nor is it intended for determining the scope of the claimed subject matter.

In general, a massage device can include a first wheel assembly, comprising: a first base; a first wheel supported at a predetermined distance from a first side of the first base; at least one first stem attached to a second side of the first base; the massage device further comprising: a body, the body having at least one socket, wherein the at least one socket is constructed and arranged to receive the at least one first stem, and wherein the body is constructed and arranged to prevent the at least one first stem from rotating within the at least one socket; and two or more arms connected to the body, wherein the two or more arms are constructed and arranged to removably mount the body onto a wall of a building.

Other illustrative variations within the scope of the invention will become apparent from the detailed description provided hereinafter. The detailed description and enumerated variations, while disclosing optional variations, are intended for purposes of illustration only and are not intended to limit the scope of the invention.

BRIEF DESCRIPTION OF THE DRAWINGS

A more complete understanding of the embodiments, and the attendant advantages and features thereof, will be more readily understood by references to the following detailed description when considered in conjunction with the accompanying drawings wherein.

Figure 1A:
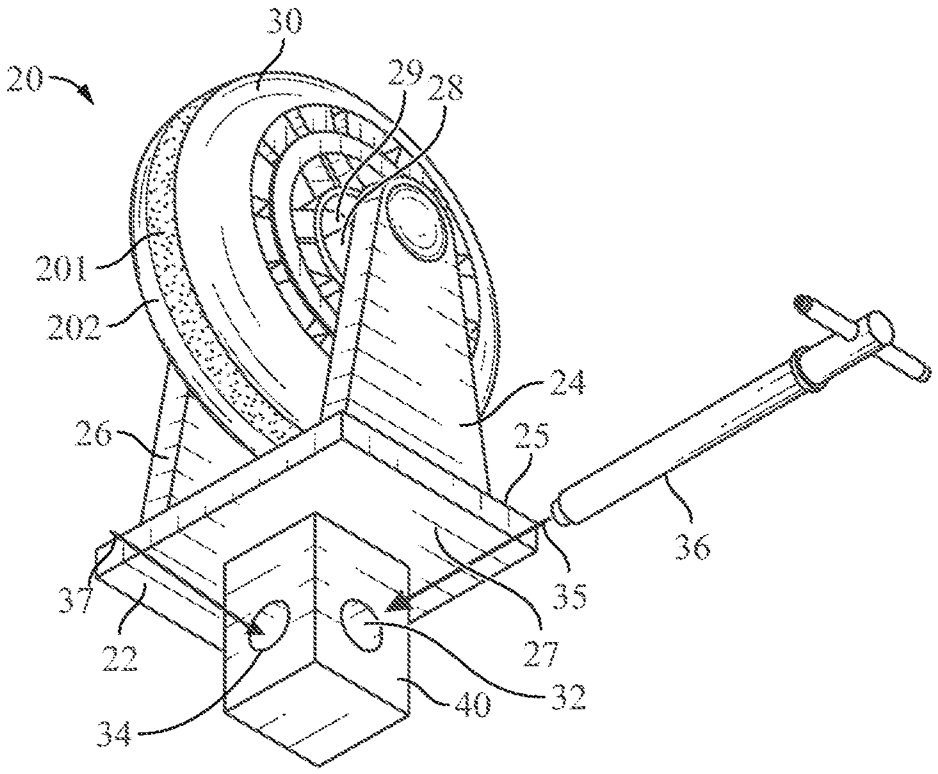
FIGS. 1A-1C illustrate illustrative depictions of a wheel assembly of a massage device, according to some embodiments disclosed herein.

The drawings are not necessarily to scale, and certain features and certain views of the drawings may be shown exaggerated in scale or in schematic in the interest of clarity and conciseness.

DETAILED DESCRIPTION

The specific details of the single embodiment or variety of embodiments described herein are to the described product or methods of use. Any specific details of the embodiments are used for demonstration purposes only and no unnecessary limitations or inferences are to be understood from there.

It is noted that the embodiments reside primarily in combinations of components and procedures related to the products. Accordingly, the product and components have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

In general, the embodiments described herein relate to a massage device that a user can mount to massage themselves while the massage device is mounted. A massage can relieve a user's stress and pain, while enhancing the body's physical health, mental well being, and immune system, in addition to improving posture and physical movement, flexibility and athletic performance. A massage can also help increase a user's blood circulation.

The massage device can include one or more wheel assemblies, wherein a first wheel assembly of the one or more wheel assemblies can comprise: a first base; a first wheel supported at a predetermined distance from a first side of the first base; at least one first stem attached to a second side of the first base; the massage device further comprising: a body, the body having at least one socket, wherein the at least one socket is constructed and arranged to removably receive the at least one first stem. In some embodiments, the body can be constructed and arranged to prevent the at least one first stem from rotating within the at least one socket.

The massage device can further include two or more arms connected to the body, wherein the two or more arms are constructed and arranged to removably mount the body onto a wall of a building such as, for example, a house.

In some embodiments, the first wheel assembly can be interchangeable with any other wheel assembly of the one or more wheel assemblies. The one or more wheel assemblies can include differently sized wheels and/or differently shaped wheels. In some embodiments the massage device can be portable.

In some embodiments, the body can be made primarily of metal, plastic, wood, or any combination thereof. In some embodiments, the body can be approximately 8 to 20 inches in length, approximately 6 inches in width, and approximately 1 to 2 inches in thickness. In some embodiments, the two or more arms can be made primarily of metal, plastic, wood, or any combination thereof. In some embodiments, the two or more arms can each be approximately 2 to 6 inches in length. In some embodiments, the first wheel can be approximately 2 inches to approximately 5 inches in diameter, and approximately 0.5 inches to approximately 5 inches in width.

Referring to FIG. 1A, a massage device (e.g., 10 in FIG. 5) can include a first wheel assembly 20. The first wheel assembly 20 can include a first base 22. A first leg 24 can be attached to (e.g., integrated with) a first side 25 of the first base 22. A second leg 26 can be attached to the first side 25 of the first base. A first axle 28 can be connected to the first leg 24 and extend into a first wheel 30. The first leg 24 can be connected to the second leg 26 by the first axle 28. In some embodiments, the axle 28 can extend through a hub 29 of the first wheel. In some embodiments, the first axle 28 can be constructed and arranged to support a massaging head, such as, for example, the first wheel 30. In some embodiments, the first wheel 30 can be constructed and arranged to rotate around the first axle 28. The first wheel 30 can rotate on or rotate with the first axle 28. In some embodiments, the first axle 28 can be rotationally fixed to the base 22 by the first 24 and/or 26 second leg to prevent the first wheel 30 from swiveling. While shown is a first wheel 30 attached to the first base 22, a different massaging head (e.g., ball head, U-shaped head, fork head, flat head, etc.) can be attached to the first base 22 instead of the first wheel 30.

During operation, at least a first (e.g., inner) portion 201 of the first wheel 30 can be used as an applicator of an oil, lotion, cream, ointment, etc., or any combination thereof, on any portion of a user's body. For example, at least the first portion 201 of the first wheel 30 can be at least partially water and/or oil absorbent. In some embodiments, at least the first portion 201 of the first wheel 30 can be constructed and arranged to absorb an oil, lotion, cream, ointment, or any combination thereof. In some embodiments, when at least the first portion 201 of the first wheel 30 is contacted by any portion of a user's body, at least the first portion 201 of the first wheel 30 can release the absorbed oil, lotion, cream, ointment, or any combination thereof onto any contacted portion of the user's body.

In some embodiments, at least the first portion 201 of the first wheel 30 can be porous and compressible. For example, at least the first portion 201 of the first wheel 30 can comprise a spongy material that is porous and compressible. In some embodiments, at least the first portion 201 of the first wheel 30 can comprise a textile material such as, for example, felt, cotton, polyester, etc. In some embodiments, at least the first portion 201 of the first wheel 30 can comprise a textile fiber such as, for example, wool, cotton, polyester, etc. In some embodiments, at least a second (e.g., outer) portion 202 of the first wheel 30 can be made primarily of polyurethane.

The first wheel assembly 20 can further include at least one first stem 40 attached to (e.g., integrated with) a second side 27 of the first base 22. In some embodiments, the at least one first stem 40 is rotationally fixed to the base 22. In some embodiments, the first side 25 of the first base 22 faces the first wheel 30. In some embodiments, the second side 27 of the first base 22 faces the at least one first stem 40.

The at least one first stem 40 can have a hole 32 constructed and arranged to receive a pin 36 in a first direction 35. The at least one first stem 40 can have another hole 34 constructed and arranged to receive the pin 36 in a second direction 37 that is generally perpendicular to the first direction 35. As detailed with respect to FIG. 1B, the pin 36 can be constructed and arranged to fasten the first wheel assembly 20 to a body (e.g., 50 in FIG. 1B). In some embodiments, the pin 36 can be a lynch pin.

Figure 1B:
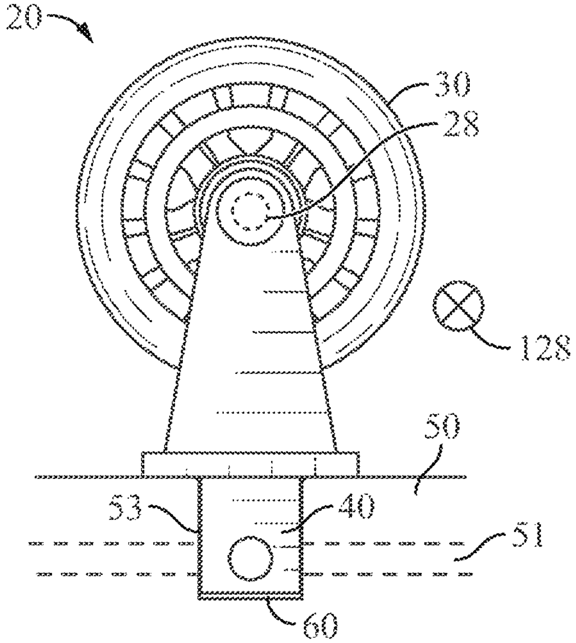

Referring to FIG. 1B, a massage device (e.g., 10 in FIG. 5) can include a body 50, the body 50 having at least one socket 60 that is constructed and arranged to receive the at least one first stem 40. In some embodiments, the at least one socket 60 is constructed and arranged to slidably receive the at least one first stem 40. The at least one socket 60 can be constructed and arranged to receive the at least one first stem 40 in a first orientation so that the first axle 28 is generally parallel to a first direction 128. In some embodiments, the at least one socket 60 can be constructed and arranged to slidably release the at least one first stem 40 to separate the first wheel assembly 20 from the body 50. FIG. 1A illustrates that the first wheel assembly 20 is separated from the body 50 in FIG. 1B.

Figure 1C:
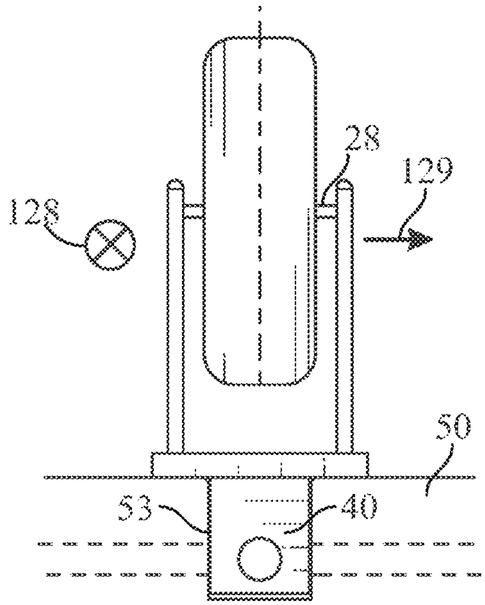

Referring to FIG. 1C, the at least one socket 60 can be constructed and arranged to receive the at least one first stem 40 in a second orientation so that the first axle 28 is generally parallel to a second direction 129 that is different from the first direction 128. In some embodiments, the first direction 128 can be generally perpendicular to the second direction 129. In some embodiments, the at least one socket 60 can be constructed and arranged to slidably receive and slidably release stems of different wheel assemblies (e.g., 20 in FIG. 1A, 20' in FIG. 9) so that any wheel assembly can be interchangeable with any other wheel assembly having a stem of substantially the same size and shape.

The body 50 can have at least one hole 51 that is constructed and arranged to receive a pin (e.g., 36 in FIG. 1A). In some embodiments, the at least one hole 51 can receive the pin while the at least one first stem 40 is received in the at least one socket 60. The pin 36 can be constructed and arranged to fasten the first wheel assembly 20 to the body 50.

In some embodiments, at least a portion 53 of the body 50 can be constructed and arranged to engage with the at least one first stem 40 to prevent the at least one first stem 40 from rotating within the at least one socket 60. In some embodiments, a pin (e.g., 36 in FIG. 1A) can engage with the body 50 and the at least one first stem 40 to prevent the at least one first stem 40 from rotating within the socket 60. At least the portion 53 of the body 50 can define the at least one socket 60. In some embodiments, the at least one socket 60 can be shaped to securely receive the at least one first stem 40. For example, the at least one socket 60 and the at least one first stem 40 can have substantially rectangular cross-sections. However, the at least one socket 60 and the at least one first stem 40 can have any other suitably shaped cross-sections.

Figure 2:
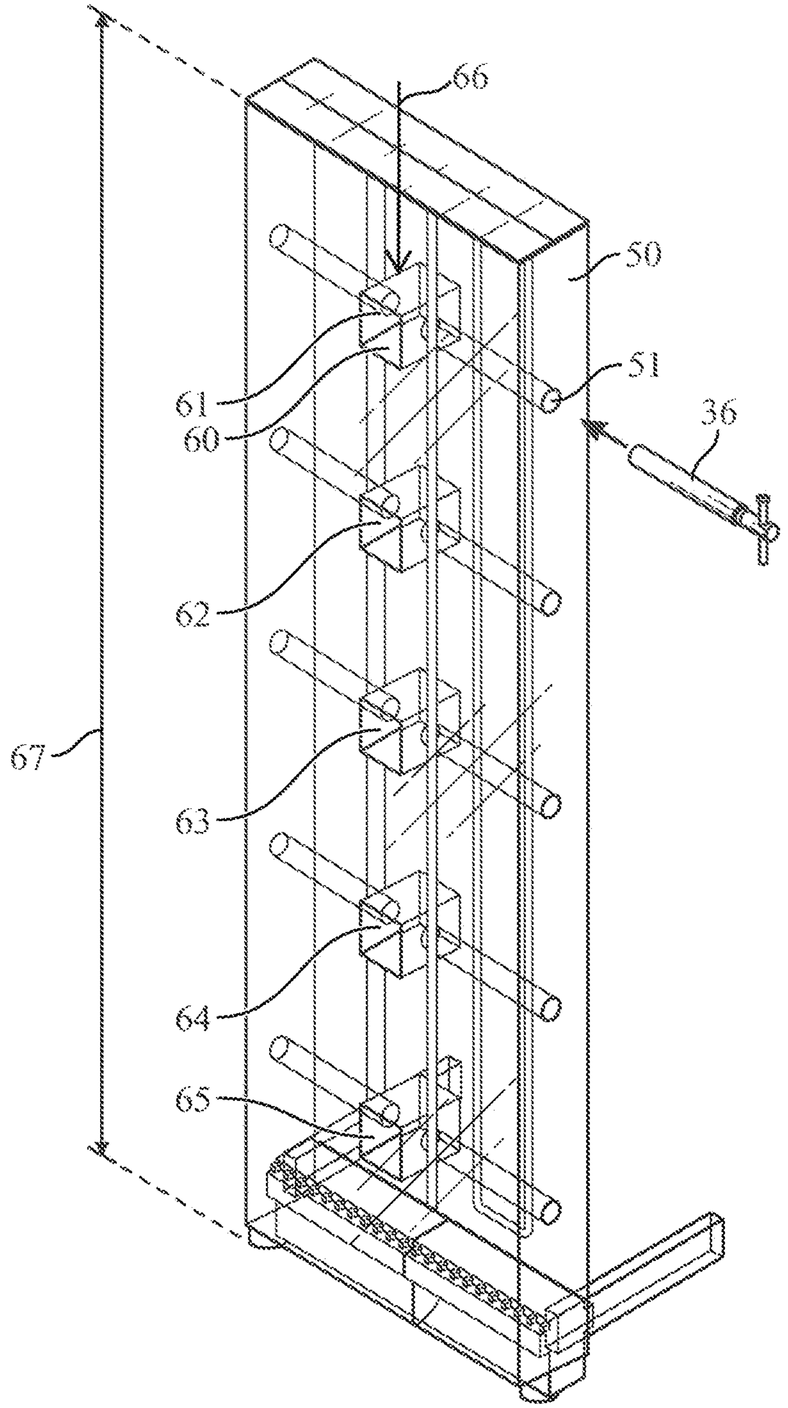
FIG. 2 illustrates an illustrative depiction of a body of a massage device, according to some embodiments disclosed herein.

Referring to FIG. 2, in some embodiments, the body 50 can be elongate, wherein the at least one socket 60 includes a plurality of sockets 61, 62, 63, 64, 65 that are arranged in a single direction 66 along a length 67 of the body 50.

Figure 3:
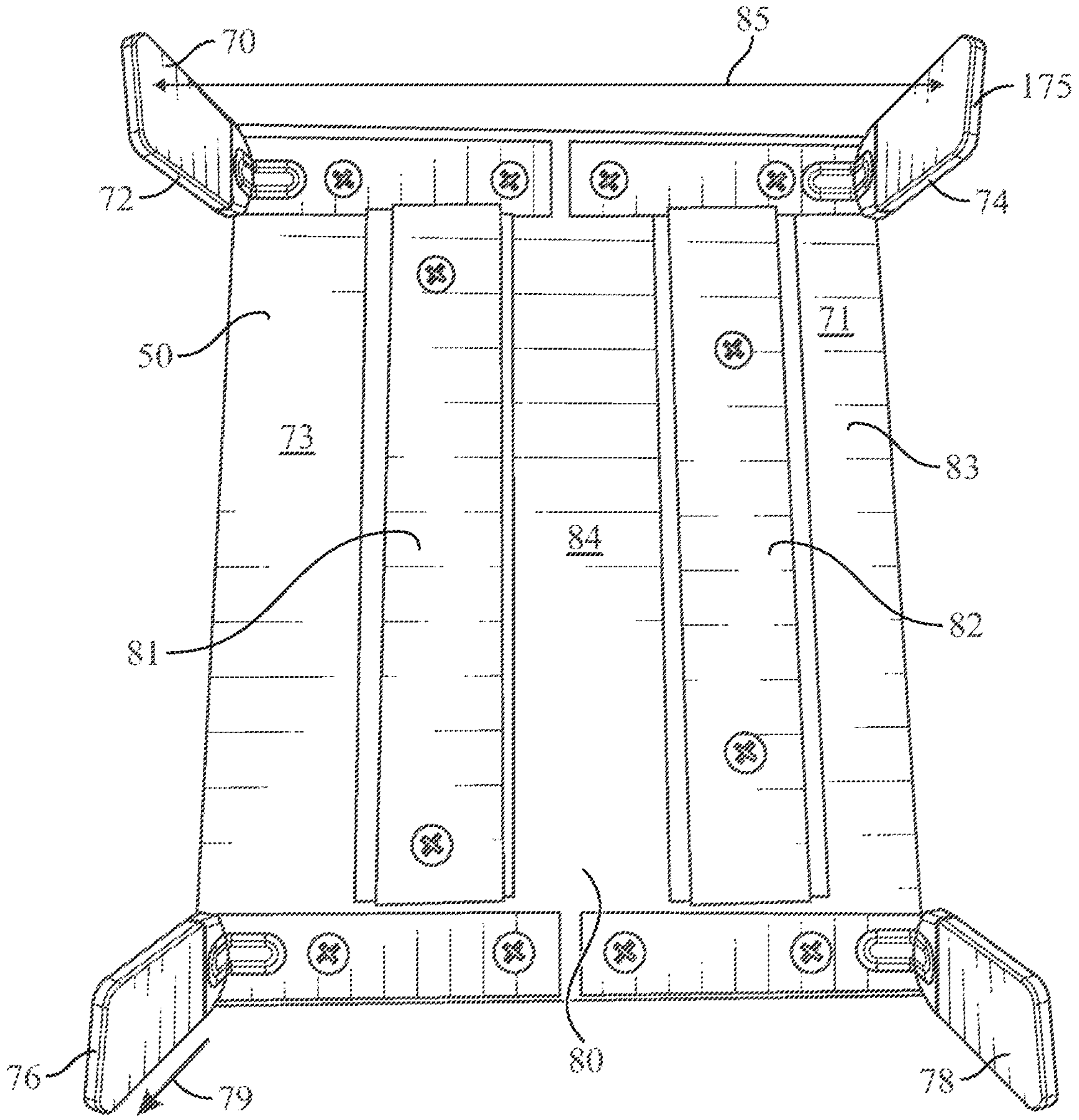
FIG. 3 illustrates an illustrative depiction of a body of a massage device with arms extended, according to some embodiments disclosed herein.

Referring to FIG. 3, two or more arms 70 can be connected to the body 50. In some embodiments, the two or more arms 70 can be constructed and arranged to extend from the body 50 in a first direction 79. In some embodiments, the first direction 79 can be generally perpendicular to a surface 73 of the body 50. The first arm 72 can be separated from a second arm 74 of the two or more arms 70 by a first distance 85 so that the first arm 72 and the second arm 74 can engage with respective moldings (e.g., 102, 104 in FIG. 6) on a wall (e.g., 103 in FIG. 5). Similarly, a third arm 76 can be separated from a fourth arm 78 by the first distance 85 so that the third arm 76 and the fourth arm 78 can engage with respective moldings on the wall. The first distance 85 can be any suitable distance so that the two or more arms 70 engage with any portion of a wall (e.g., including a wall without moldings), any moldings on a wall, or any other decorative or functional objects mounted on a wall. In some embodiments, the first distance 85 can be approximately 6 inches. As walls can have different thicknesses, the first distance 85 can be any suitable distance in the range from approximately 4 inches to approximately 10 inches. In some embodiments, the two or more arms 70 can be covered by gripping material 175 (e.g., rubber) that provides traction on any portion of a wall, including moldings. In some embodiments, the two or more arms 70 can be constructed and arranged to engage with at least trees, poles and other objects that having a width of approximately 4 inches to 10 inches.

In some embodiments, the body 50 can define a channel 80 that is constructed and arranged to receive a door stop (e.g., 94 in FIG. 5) on a first side 71 of the body 50. In some embodiments, the body 50 can include a first elongate member 81 and a second elongate member 82 attached to (e.g., integrated with) a board member 83. In some embodiments, the first elongate member 81 and the second elongate member 82 can be attached to the board member 83 by a fastener, an adhesive, VELCRO®, etc. In some embodiments, the first elongate member 81, the second elongate member 82, and a portion 84 of the board member 83 can define the channel 80. During operation, the first elongate member 81, the second elongate member 82 and the portion 84 of the board member 83 can engage with at least a door stop of a door jamb area (e.g., 90 in FIG. 5) of a wall (e.g., 103 in FIG. 5).

Figure 4:
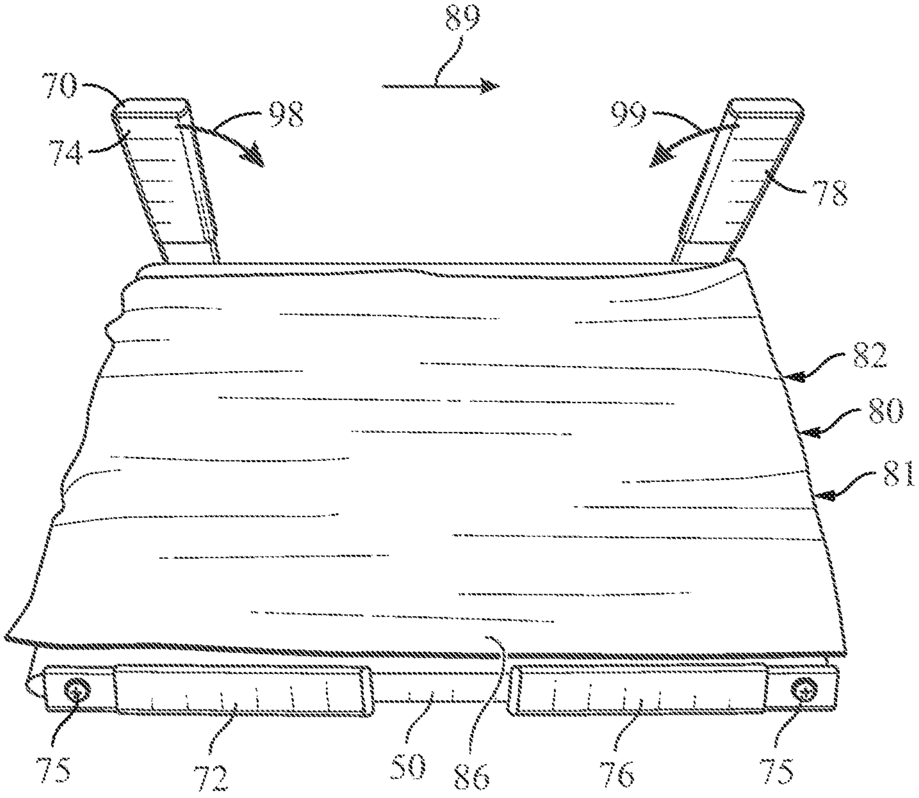
FIG. 4 illustrates an illustrative depiction of a body of a massage device with a liner, according to some embodiments disclosed herein.

Referring to FIG. 4, the two or more arms 70 can be fastened to the body 50 with fasteners 75. Each of the two or more arms 70 can be constructed and arranged to be rotated in directions 98, 99 about a corresponding fastener 75. In some embodiments, each of the two or more arms 70 can be constructed and arranged to be rotated so each of the two arms 70 is generally parallel to a second direction 89 that is generally perpendicular to the first direction 79. In some embodiments, each of the two or more arms 70 can be constructed and arranged to be rotated so each of the two arms 70 is generally parallel to the surface (e.g., 73 in FIG. 3) of the body 50. In some embodiments, each of the two or more arms 70 can be constructed and arranged to be rotated so each of the two arms 70 is flush with the surface 73 of the body 50.

A liner 86 can be disposed over the first side 71 of the body 50. In some embodiments the liner 86 can be positioned over the body 50 or any portion thereof, including the surface 73 of the body 50, the first elongate member 81, the second elongate member 82, the portion 84 of the board member 83, or any combination thereof. In some embodiments, the liner 86 can be positioned within the channel 80. The liner 86 can be constructed and arranged to provide traction on at least a door jamb area (e.g., 90 in FIG. 5) of a wall (e.g., 103 in FIG. 5), including a door stop (e.g., 94 in FIG. 5), moldings (e.g., 102, 104 in FIG. 6), or any combination thereof. In some embodiments, the liner 86 can be constructed and arranged to provide cushioning between any portion of the wall (e.g., including the door jamb area and the moldings) and the massage device to protect any portion of the wall from being damaged (e.g., scratched) by the massage device. In some embodiments, the liner 86 can be made primarily of gripping material. For example, the liner 86 can be textured and rubberized.

Figure 5:
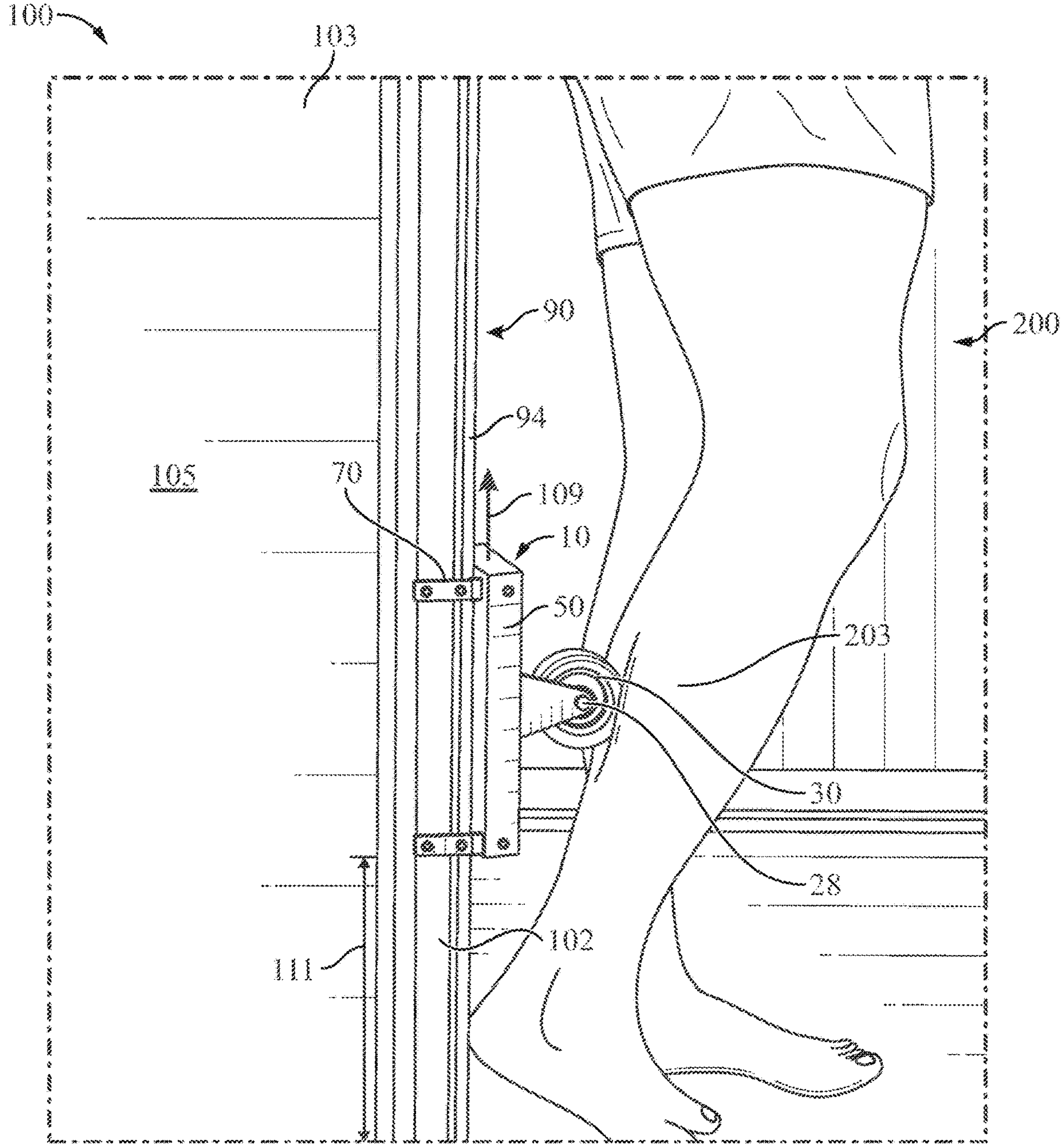
FIG. 5 illustrates an illustrative depiction of a massage device mounted onto a wall, according to some embodiments disclosed herein.

Referring to FIG. 5, a massage device 10 can include two or more arms 70 are constructed and arranged to removably mount the body 50 onto a wall 103 of a building 100 by removably engaging with at least a first molding 102 on a first side 105 of the wall 103 and a second molding (e.g., 104 in FIG. 6) on a second side (e.g., 107 in FIG. 6) of the wall 103. When the body 50 is mounted to the wall 103, the wheel 30 can also be mounted to the wall 103. A user 200 can massage any portion of the user's body, such as, for example, their leg 203 by pressing their leg 203 against the wheel 30 and by rolling the wheel 30 with and over their leg 203 while the massage device 10 is mounted. Any portion of the user's body, such as the user's back, neck, chest, shoulder, etc., can be massaged in a similar manner by adjusting a height 111 of the massage device 10 as necessary. The user 200 can massage themselves in different manners, such as by rolling the wheel 30 against any portion of the user's body while the massage device 10 is mounted onto the wall 103, or by moving any portion of the user's body against the wheel 30 and in a direction parallel to the first axle 28, which prevents the wheel 30 from rolling. The user 200 can increase the amount of pressure received during the massage, such as by pushing any portion of the user's body against the wheel 30 with increased force, or by leaning any portion of the user's body against the wheel 30. The massage device 10 can be constructed and arranged to support at least any suitable partial weight of the user 200. For example, the massage device 10, including the wheel assembly 20, can be constructed and arranged to support approximately 10 pounds to approximately 100 pounds.

The height 111 of the massage device 10 can be adjusted by removing the body 50 from the wall 103 (e.g., by pulling the body 50 from the wall 103), and by removably mounting the body 50 onto the wall 103 at any other height along the door jamb area 90 (e.g., by pushing the body 50 toward the wall 103 while the two or more arms 70 are extended toward the wall 103). In some embodiments, the massage device 10 can be moved to any height along the door jamb area 90, and for example along the direction 109 that is generally parallel to the door stop 94. In some embodiments, the massage device 10 can be moved along the door stop 94.

Figure 6:
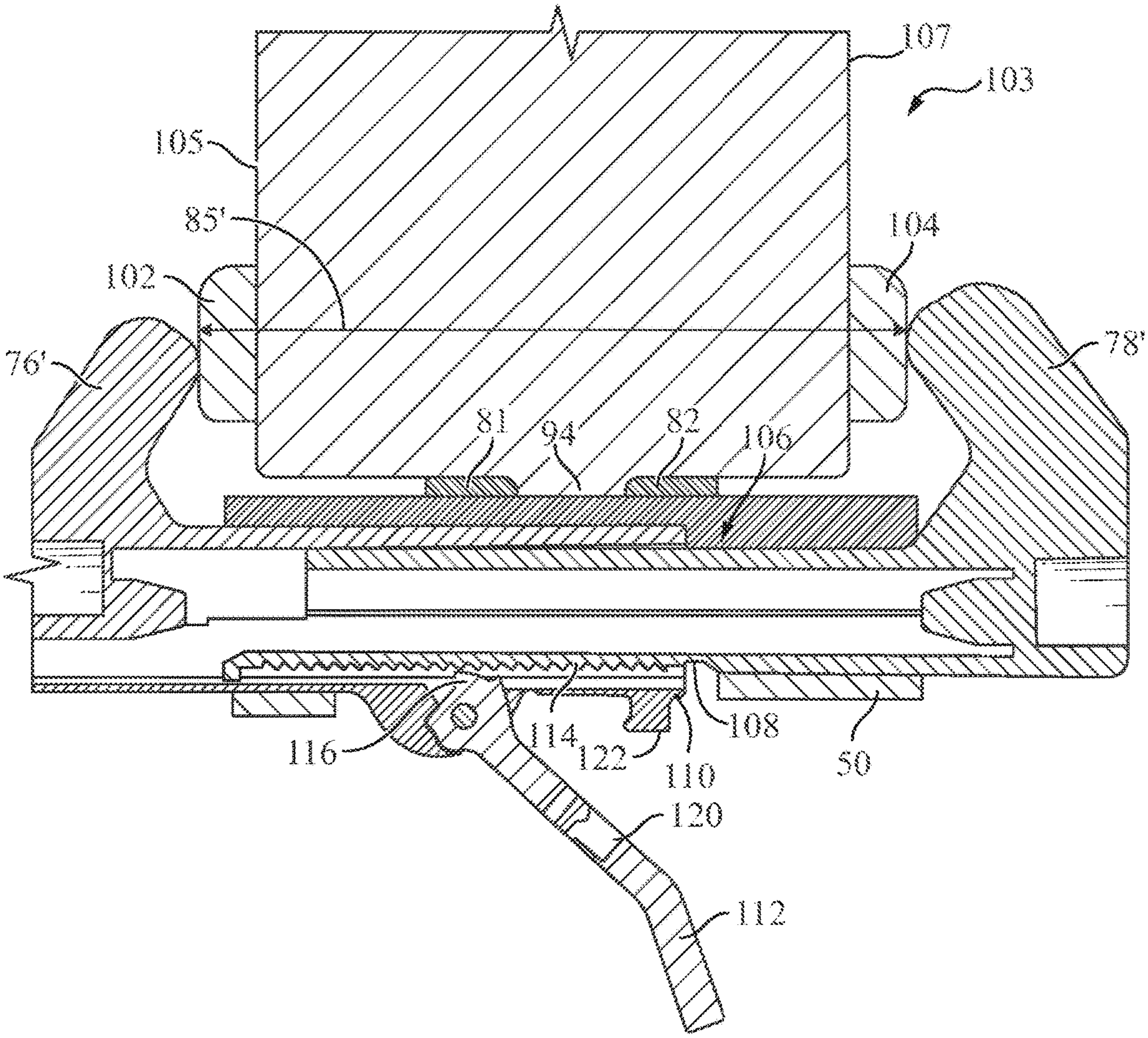
FIG. 6 illustrates an illustrative depiction of a massage device having a telescopic shaft between at least two arms, with a lever in an open position, according to some embodiments disclosed herein.

Referring to FIG. 6, a first arm 76' of the two or more arms 70 is constructed and arranged to engage with at least the first molding 102 on the first side 105 of the wall 103, and a second arm 78' of the two or more arms 70 is constructed and arranged to engage with at least the second molding 104 on the second side 107 that is opposite to the first side 105 of the wall 103. In some embodiments, the first arm 76' and the second arm 78' can be curved toward each other to better grip the first 102 and second 104 moldings.

In some embodiments, a distance 85' between the first arm 76' and the second arm 78' can be adjustable. For example, the first arm 76' and the second arm 78' can be connected by a telescoping shaft 106 comprising an outer (e.g., hollow) shaft 110 that is constructed and arranged to receive an inner shaft 108. In some embodiments, the first arm 76' can be attached to the outer shaft 110, and the second arm 78' can be attached to the inner shaft 108. As the inner shaft 108 is inserted into the outer shaft 110, the distance 85' between the first arm 76' and the second arm 78' can be reduced. As the inner shaft 108 is retracted from the outer shaft 110, the distance 85' between the first arm 76' and the second arm 78' can be increased.

A lever 112 can be attached to the outer shaft 110. In some embodiments, the lever 112 can be attached to at least one tooth 116 that is constructed and arranged to engage with teeth 114 on the inner shaft 108. In FIG. 6, the lever is in an open position wherein the at least one tooth 116 attached to the lever 112 is not engaged with the any of the teeth 114 on the inner shaft 108.

Figure 7:
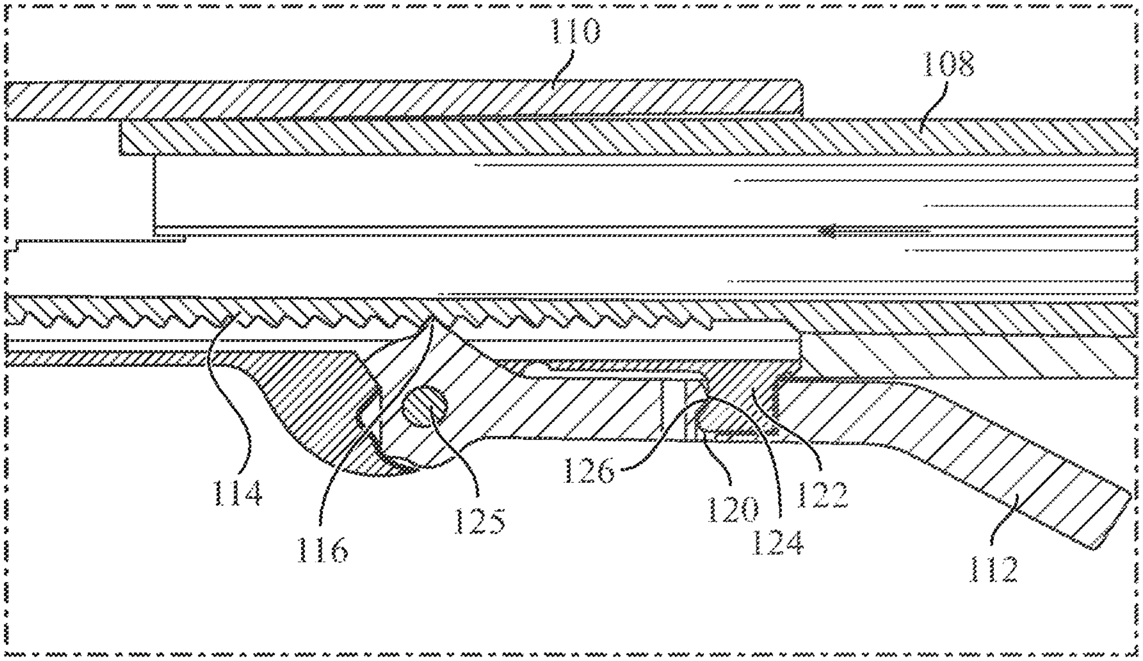
FIG. 7 illustrates an illustrative depiction of a massage device having a telescopic shaft between at least two arms, with a lever in a closed position, according to some embodiments disclosed herein.

Referring to FIG. 7, the lever 112 can be rotated about a pivot 125 so that the lever 112 is in a closed position. In the closed position, the at least one tooth 116 attached to the lever 112 is engaged with at least some of the teeth 114 on the inner shaft 108. When the at least one tooth 116 attached to the lever 112 is engaged with at least some of the teeth 114 on the inner shaft 108, the inner shaft 108 can be affixed to the outer shaft 110, preventing the inner shaft 108 from being inserted into, or retracted from, the outer shaft 110.

A cavity 120 in the lever 112 can be constructed and arranged to receive a portion 122 of the body 50. The portion 122 of the body can have a recess 124 that is constructed and arranged to receive a protrusion 126 in the cavity 120 of the lever 112, thereby interlocking the lever 112 with the body 50, which prevents the lever 112 from being rotated about the pivot 125, and prevents the at least one tooth 116 from disengaging with at least some of the teeth 114 on the inner shaft 108.

Figure 8:
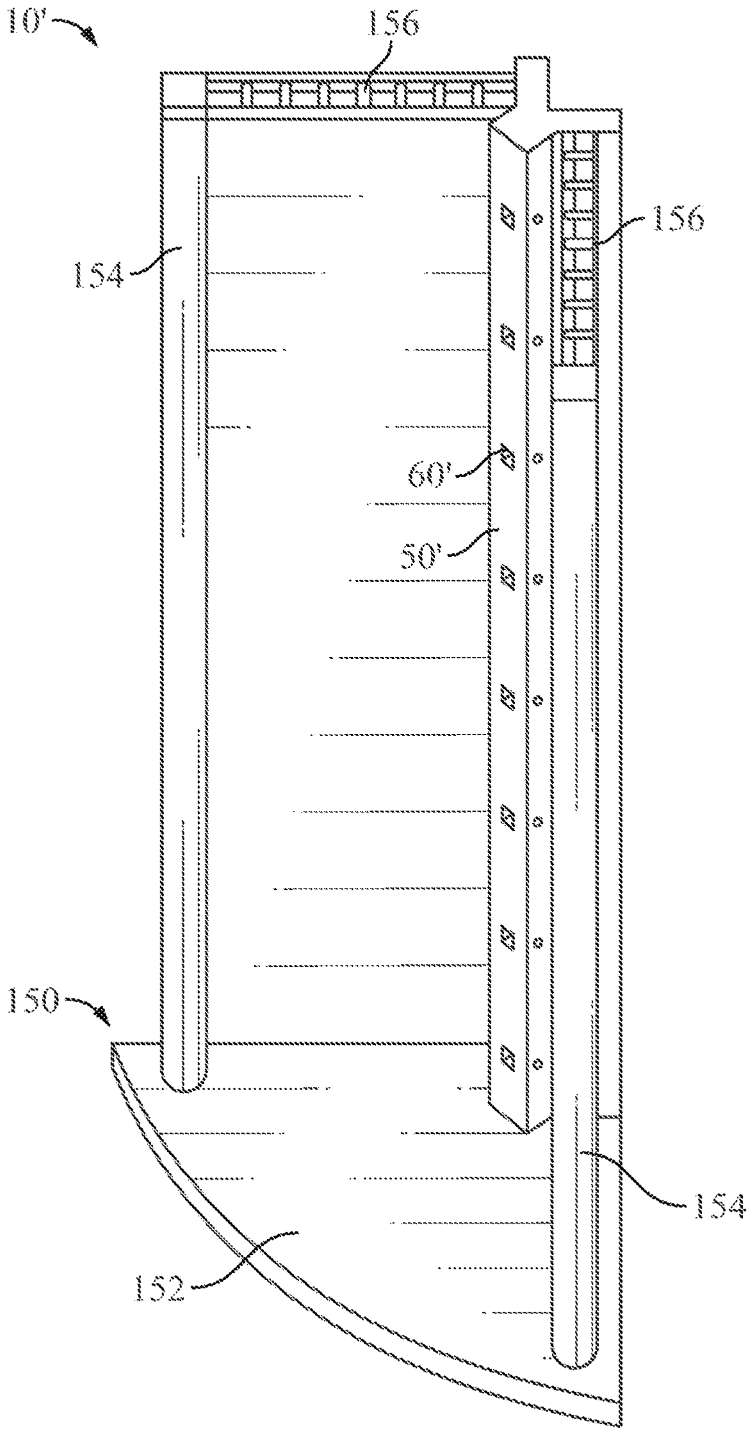
FIG. 8 illustrates an illustrative depiction of a massage device having a stand, according to some embodiments disclosed herein.

Referring to FIG. 8, a massage device 10' can include a body 50' that can be attached to a base 152 of a stand 150, the stand 150 further comprising two or more vertical supports 154 attached to the base 152, the two or more vertical supports 154 being attached to horizontal supports 156. The horizontal supports 156 can be attached to the body 50' to provide lateral support thereto. In some embodiments, the body 50' can be approximately 5 feet to approximately 7 feet in height.

In some embodiments, the body 50' can have at least one socket 60' that is constructed and arranged to slidably receive and slidably release stems (e.g., 40 in FIG. 1A) of different wheel assemblies (e.g., 20 in FIG. 1A, 20' in FIG. 9) so that any wheel assembly can be received and released by the at least one socket 60'.

Figure 9:
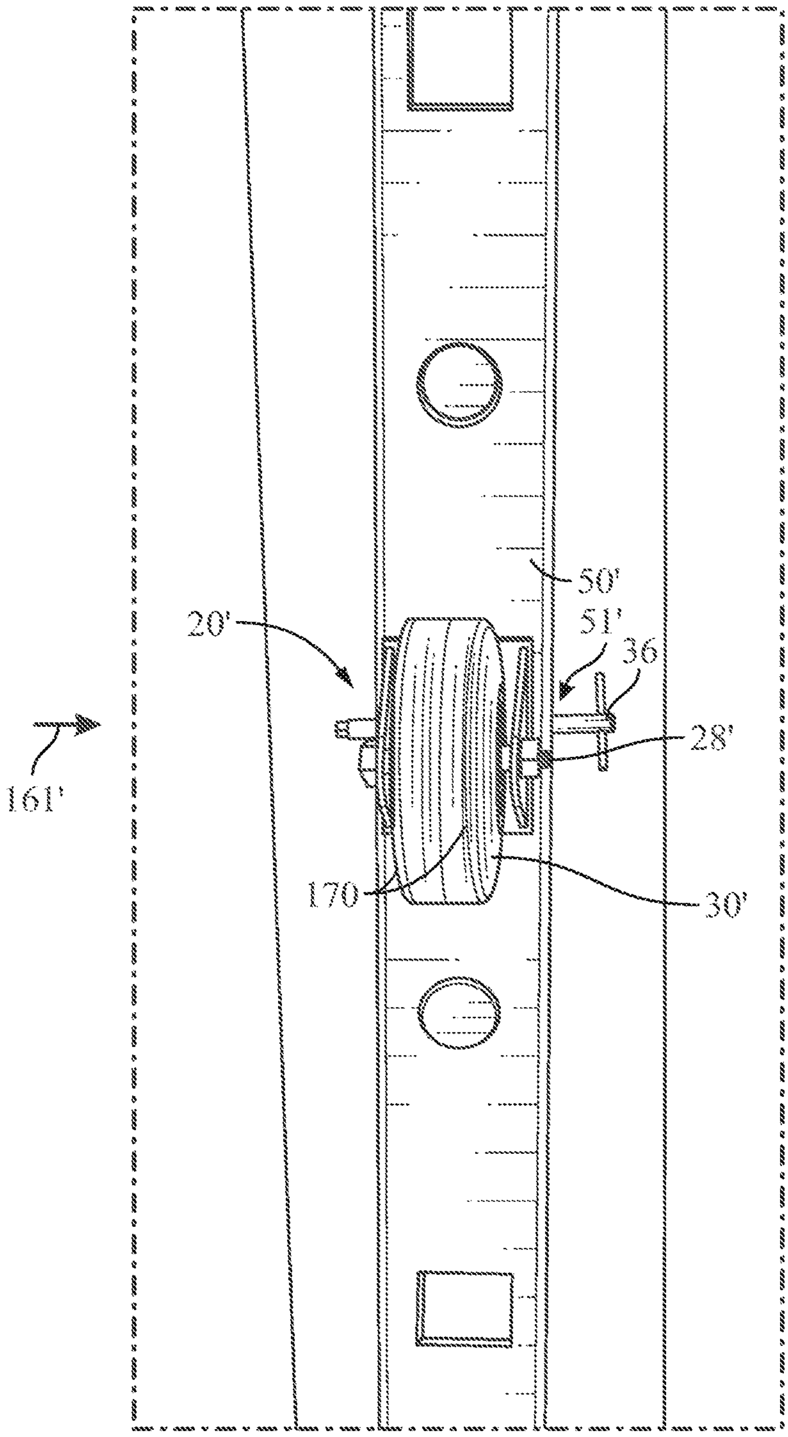
FIG. 9 illustrates an illustrative depiction of a massage device having an axle parallel to a first direction, according to some embodiments disclosed herein.

Referring to FIG. 9, the body 50' can have at least one hole 51' that is constructed and arranged to receive a pin 36. The pin 36 can be received by the at least one hole 51' of the body 50' while the pin 36 is received in a hole (e.g., 32, 34 in FIG. 1A) of at least one stem (e.g., 40 in FIG. 1A) of the first wheel assembly 20', thereby fastening the first wheel assembly 20' to the body 50'. A first axle 28' of the first wheel assembly 20' can be generally parallel to a first (e.g., horizontal) direction 161' when, for example, the pin 36 is received in a hole (e.g., 32 in FIG. 1A) of the at least one first stem in a direction (e.g., 35 in FIG. 1A) that is generally parallel to the first axle 28'. When the first axle 28' is generally parallel to the first direction 161', the wheel 30' can roll upward or downward on a user's body.

The wheel 30' can have substantially angled edges 170 that are constructed and arranged to provide increased pressure when rolled on any portion of a user's body. However, in other embodiments, the wheel can be rounded such as the wheel 30 in FIG. 1A.

Figure 10:
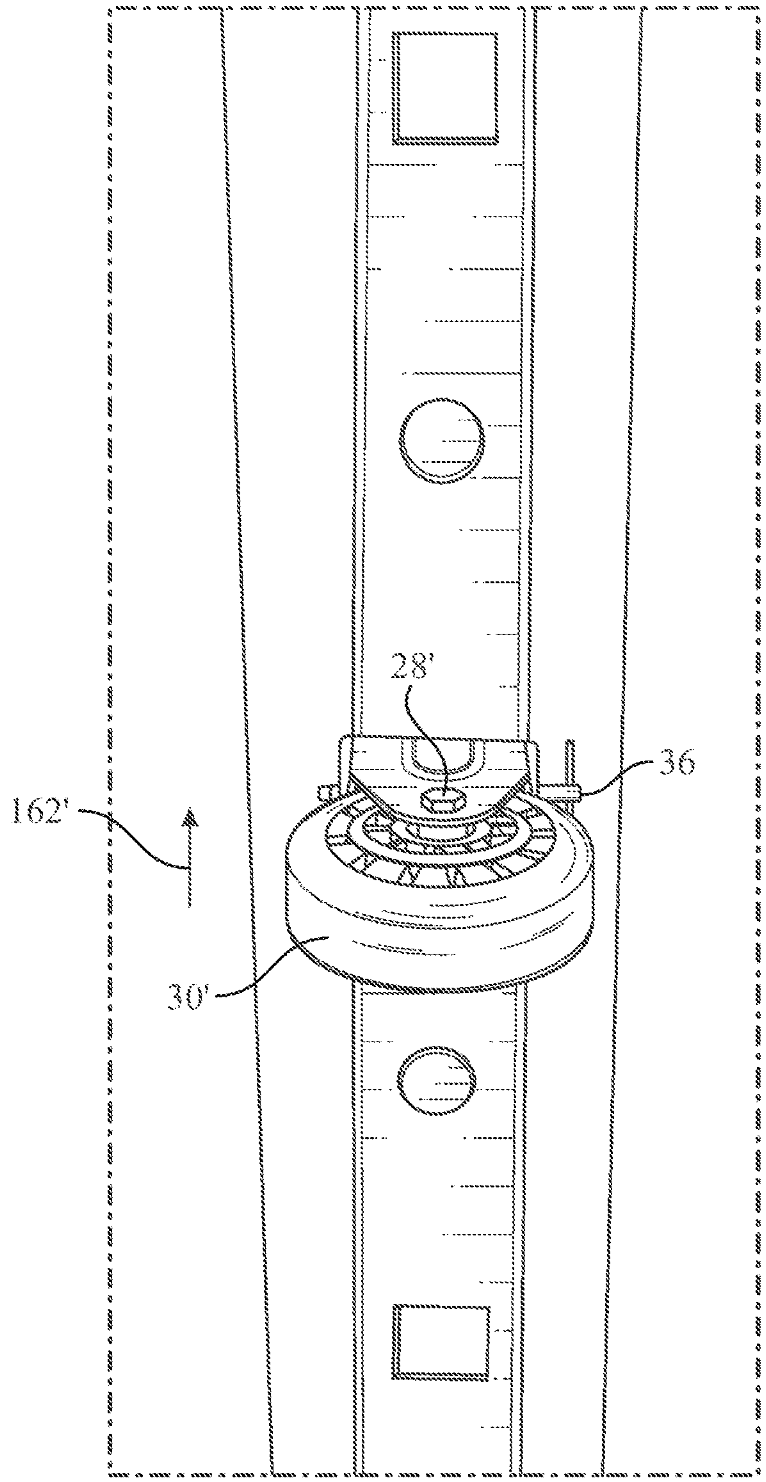
FIG. 10 illustrates an illustrative depiction of a massage device having an axle parallel to a second direction, according to some embodiments disclosed herein.

Referring to FIG. 10, the first axle 28' of the first wheel assembly 20' can be generally parallel to a second (e.g., vertical) direction 162' when, for example, the pin 36 is received in a hole (e.g., 34 in FIG. 1A) of the at least one first stem (e.g., 40 in FIG. 1A) in a direction (e.g., 37 in FIG. 1A) that is generally perpendicular to the first axle 28. In some embodiments, the second direction 162' is different than the first direction. In some embodiments, the second direction 162' is generally perpendicular to the first direction 161'. When the first axle 28' is generally parallel to the second direction 162', the wheel 30' can roll side-to-side on a user's body.

The following description of variants is only illustrative of components, elements, acts, products, and methods considered to be within the scope of the invention and are not in any way intended to limit such scope by what is specifically disclosed or not expressly set forth. The components, elements, acts, products, and methods as described herein may be combined and rearranged other than as expressly described herein and are still considered to be within the scope of the invention.

According to variation 1, a massage device can include a first wheel assembly, including: a first base; a first leg attached to a first side of the first base; a first wheel; a first axle connected to the first leg, the first axle extending into the first wheel, the first axle being constructed and arranged to support the first wheel; wherein the first wheel is constructed and arranged to rotate around the first axle; the first wheel assembly further including: at least one first stem attached to a second side of the first base, wherein: the first side of the first base faces the first wheel; the second side of the first base faces the at least one first stem; the massage device further comprising: a body, the body having at least one socket, wherein the at least one socket is constructed and arranged to receive the at least one first stem, and wherein the body is constructed and arranged to engage with the at least one first stem to prevent the at least one first stem from rotating within the at least one socket; and two or more arms connected to the body, wherein the two or more arms are constructed and arranged to removably mount the body onto a wall of a building by removably engaging with at least a first molding on a first side of the wall and a second molding on a second side of the wall, wherein a first arm of the two or more arms is constructed and arranged to engage with at least the first molding on the first side of the wall, and wherein a second arm of the two or more arms is constructed and arranged to engage with at least the second molding on the second side of the wall.

Variation 2 can include the massage device of variation 1, wherein at least a first portion of the first wheel comprises a spongy material.

Variation 3 can include the massage device of variation 1, further comprising a pin, wherein: the at least one first stem has a hole constructed and arranged to receive the pin; the body has a hole constructed and arranged to receive the pin; the pin is constructed and arranged to fasten the first wheel assembly to the body.

Variation 4 can include the massage device of variation 1, wherein the body is elongate, wherein the at least one socket includes a plurality of sockets that are arranged in a single direction along a length of the body.

Variation 5 can include the massage device of variation 1, wherein at least a second portion of the first wheel is made primarily of polyurethane.

Variation 6 can include the massage device of variation 1, wherein body defines a channel that is constructed and arranged to receive a door stop.

Variation 7 can include the massage device of variation 1, further comprising a textured rubberized liner disposed over at least a portion of a first side of the body.

According to variation 8, a massage device can include a first wheel assembly, including: a first base; a first leg attached to a first side of the first base; a first wheel; a first axle connected to the first leg, the first axle extending into the first wheel, the first axle being constructed and arranged to support the first wheel; wherein the first wheel is constructed and arranged to rotate around the first axle; the first wheel assembly further including: at least one first stem attached to a second side of the first base, wherein: the first side of the first base faces the first wheel; the second side of the first base faces the at least one first stem; the massage device further comprising: a body, the body having at least one socket, wherein the at least one socket is constructed and arranged to receive the at least one first stem so that the first axle is generally parallel to a first direction, wherein the at least one socket is further constructed and arranged to receive the at least one first stem so that the first axle is generally parallel to a second direction that is different from the first direction, and wherein the body is constructed and arranged to engage with the at least one first stem to prevent the at least one first stem from rotating within the at least one socket; and two or more arms connected to the body, wherein the two or more arms are constructed and arranged to removably mount the body onto a wall of a building by removably engaging with at least a first molding on a first side of the wall and a second molding on a second side of the wall, wherein a first arm of the two or more arms is constructed and arranged to engage with at least the first molding on the first side of the wall, and wherein a second arm of the two or more arms is constructed and arranged to engage with at least the second molding on the second side of the wall.

Variation 9 can include the massage device of variation 8, wherein at least a first portion of the first wheel comprises a spongy material.

Variation 10 can include the massage device of variation 8, further comprising a pin, wherein: the at least one first stem has a hole constructed and arranged to receive the pin; the body has a hole constructed and arranged to receive the pin; the pin is constructed and arranged to fasten the first wheel assembly to the body.

Variation 11 can include the massage device of variation 8, wherein the body is elongate, wherein the at least one socket includes a plurality of sockets that are arranged in a single direction along a length of the body.

Variation 12 can include the massage device of variation 8, wherein at least a second portion of the first wheel is made primarily of polyurethane.

Variation 13 can include the massage device of variation 8, wherein body defines a channel that is constructed and arranged to receive a door stop.

Variation 14 can include the massage device of variation 8, further comprising a textured rubberized liner disposed over at least a portion of a first side of the body.

According to variation 15, a massage device can include: a first wheel assembly, including: a first base; a first leg attached to a first side of the first base; a first wheel; a first axle connected to the first leg, the first axle extending into the first wheel, the first axle being constructed and arranged to support the first wheel; wherein the first wheel is constructed and arranged to rotate around the first axle; the first wheel assembly further including: at least one first stem attached to a second side of the first base, wherein: the first side of the first base faces the first wheel; the second side of the first base faces the at least one first stem; the massage device further comprising: a body, the body having at least one socket, wherein the at least one socket is constructed and arranged to slidably receive the at least one first stem, and wherein the body is constructed and arranged to engage with the at least one first stem to prevent the at least one first stem from rotating within the at least one socket; and two or more arms connected to the body, wherein the two or more arms are constructed and arranged to removably mount the body onto a wall of a building by removably engaging with at least a first molding on a first side of the wall and a second molding on a second side of the wall, wherein a first arm of the two or more arms is constructed and arranged to engage with at least the first molding on the first side of the wall, and wherein a second arm of the two or more arms is constructed and arranged to engage with at least the second molding on the second side of the wall.

Variation 16 can include the massage device of variation 15, wherein at least a first portion of the first wheel comprises a spongy material.

Variation 17 can include the massage device of variation 15, further comprising a pin, wherein: the at least one first stem has a hole constructed and arranged to receive the pin; the body has a hole constructed and arranged to receive the pin; the pin is constructed and arranged to fasten the first wheel assembly to the body.

Variation 18 can include the massage device of variation 15, wherein at least a second portion of the first wheel is made primarily of polyurethane.

Variation 19 can include the massage device of variation 15, wherein body defines a channel that is constructed and arranged to receive a door stop.

Variation 20 can include the massage device of variation 15, further comprising a textured rubberized liner disposed over at least a portion of a first side of the body.

Many different embodiments have been disclosed herein, in connection with the above description and the drawings. It will be understood that it would be unduly repetitious and obfuscating to describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

An equivalent substitution of two or more elements can be made for anyone of the elements in the claims below or that a single element can be substituted for two or more elements in a claim. Although elements can be described above as acting in certain combinations, and even initially claimed as such, it is to be expressly understood that one or more elements from a claimed combination can, in some cases, be excised from the combination and that the claimed combination can be directed to a subcombination or variation of a subcombination.

It will be appreciated by persons skilled in the art that the present embodiment is not limited to what has been particularly shown and described hereinabove. A variety of modifications and variations are possible considering the above teachings without departing from the following claims.

What is claimed is:

1. A massage device, comprising:

a first wheel assembly, including:

a first base;

a first leg attached to a first side of the first base;

a first wheel;

a first axle connected to the first leg, the first axle extending into the first wheel, the first axle being constructed and arranged to support the first wheel;

wherein the first wheel is constructed and arranged to rotate around the first axle;

the first wheel assembly further including:

at least one first stem attached to a second side of the first base, wherein:

the first side of the first base faces the first wheel;

the second side of the first base faces the at least one first stem;

the massage device further comprising:

a body, the body having at least one socket, wherein the at least one socket is constructed and arranged to receive the at least one first stem, and wherein the body is constructed and arranged to engage with the at least one first stem to prevent the at least one first stem from rotating within the at least one socket, wherein the body comprises a telescoping shaft comprising a pivot, a lever, an inner shaft having at least one tooth, and an outer shaft, wherein the telescoping shaft is constructed and arranged to adjust a distance between two or more arms connected to the body, wherein the lever defines a cavity constructed and arranged to receive a portion of the body, thereby interlocking the lever with the body, which prevents the lever from being rotated about the pivot, and prevents the lever from disengaging with at least some of the tooth of the inner shaft; and wherein the two or more arms are constructed and arranged to removably mount the body onto a wall of a building by removably engaging with at least a first molding on a first side of the wall and a second molding on a second side of the wall, wherein a first arm of the two or more arms is constructed and arranged to engage with at least the first molding on the first side of the wall, and wherein a second arm of the two or more arms is constructed and arranged to engage with at least the second molding on the second side of the wall.

2. The massage device of claim 1, wherein at least a first portion of the first wheel comprises a spongy material.

3. The massage device of claim 1, further comprising a pin, wherein:

the at least one first stem has a hole constructed and arranged to receive the pin;

the body has a hole constructed and arranged to receive the pin;

the pin is constructed and arranged to fasten the first wheel assembly to the body.

4. The massage device of claim 1, wherein the body is elongated, wherein the at least one socket includes a plurality of sockets that are arranged in a single direction along a length of the body.

5. The massage device of claim 1, wherein at least a second portion of the first wheel is made primarily of polyurethane.

6. The massage device of claim 1, wherein the body defines an adjustable channel that is constructed and arranged to receive a door stop.

7. The massage device of claim 1, further comprising a textured rubberized liner disposed over at least a portion of a first side of the body.

8. A massage device, comprising:

a first wheel assembly, including:

a first base;

a first leg attached to a first side of the first base;

a first wheel;

a first axle connected to the first leg, the first axle extending into the first wheel, the first axle being constructed and arranged to support the first wheel;

wherein the first wheel is constructed and arranged to rotate around the first axle;

the first wheel assembly further including:

at least one first stem attached to a second side of the first base, wherein:

the first side of the first base faces the first wheel;

the second side of the first base faces the at least one first stem;

the massage device further comprising:

a body, the body having at least one socket, wherein the at least one socket is constructed and arranged to receive the at least one first stem so that the first axle is generally parallel to a first direction, wherein the at least one socket is further constructed and arranged to receive the at least one first stem so that the first axle is generally parallel to a second direction that is different from the first direction, and wherein the body is constructed and arranged to engage with the at least one first stem to prevent the at least one first stem from rotating within the at least one socket, and wherein the body comprises a telescoping shaft comprising a pivot, a lever, an inner shaft having at least one tooth, and an outer shaft, wherein the telescoping shaft is constructed and arranged to adjust a distance between two or more arms connected to the body, wherein the lever defines a cavity constructed and arranged to receive a portion of the body, thereby interlocking the lever with the body, which prevents the lever from being rotated about the pivot, and prevents the lever from disengaging with at least some of the tooth of the inner shaft; and wherein the two or more arms are constructed and arranged to removably mount the body onto a wall of a building by removably engaging with at least a first molding on a first side of the wall and a second molding on a second side of the wall, wherein a first arm of the two or more arms is constructed and arranged to engage with at least the first molding on the first side of the wall, and wherein a second arm of the two or more arms is constructed and arranged to engage with at least the second molding on the second side of the wall.

9. The massage device of claim 8, wherein at least a first portion of the first wheel comprises a spongy material.

10. The massage device of claim 8, further comprising a pin, wherein:

the at least one first stem has a hole constructed and arranged to receive the pin;

the body has a hole constructed and arranged to receive the pin;

the pin is constructed and arranged to fasten the first wheel assembly to the body.

11. The massage device of claim 8, wherein the body is elongated, wherein the at least one socket includes a plurality of sockets that are arranged in a single direction along a length of the body.

12. The massage device of claim 8, wherein at least a portion of the first wheel is made primarily of polyurethane.

13. The massage device of claim 8, wherein the body defines an adjustable channel that is constructed and arranged to receive a door stop.

14. The massage device of claim 8, further comprising a textured rubberized liner disposed over at least a portion of a first side of the body.

15. A massage device, comprising:

a first wheel assembly, including:

a first base;

a first leg attached to a first side of the first base;

a first wheel;

a first axle connected to the first leg, the first axle extending into the first wheel, the first axle being constructed and arranged to support the first wheel;

wherein the first wheel is constructed and arranged to rotate around the first axle;

the first wheel assembly further including:

at least one first stem attached to a second side of the first base, wherein:

the first side of the first base faces the first wheel;

the second side of the first base faces the at least one first stem;

the massage device further comprising:

a body, the body having at least one socket, wherein the at least one socket is constructed and arranged to slidably receive the at least one first stem, and wherein the body is constructed and arranged to engage with the at least one first stem to prevent the at least one first stem from rotating within the at least one socket, wherein the body comprises a telescoping shaft comprising a pivot, a lever, an inner shaft having at least one tooth, and an outer shaft, wherein the telescoping shaft is constructed and arranged to adjust a distance between two or more arms connected to the body, wherein the lever defines a cavity constructed and arranged to receive a portion of the body, thereby interlocking the lever with the body, which prevents the lever from being rotated about the pivot, and prevents the lever from disengaging with at least some of the tooth of the inner shaft; and wherein the two or more arms are constructed and arranged to removably mount the body onto a wall of a building by removably engaging with at least a first molding on a first side of the wall and a second molding on a second side of the wall, wherein a first arm of the two or more arms is constructed and arranged to engage with at least the first molding on the first side of the wall, and wherein a second arm of the two or more arms is constructed and arranged to engage with at least the second molding on the second side of the wall.

16. The massage device of claim 15, wherein at least a first portion of the first wheel comprises a spongy material.

17. The massage device of claim 15, further comprising a pin, wherein:

the at least one first stem has a hole constructed and arranged to receive the pin;

the body has a hole constructed and arranged to receive the pin;

the pin is constructed and arranged to fasten the first wheel assembly to the body.

18. The massage device of claim 15, wherein at least a portion of the first wheel is made primarily of polyurethane.

19. The massage device of claim 15, wherein the body defines a channel that is constructed and arranged to receive a door stop.

20. The massage device of claim 15, further comprising a textured rubberized liner disposed over at least a portion of a first side of the body.

* * * * *